United States Patent [19]
Horn

[11] Patent Number: 5,113,431
[45] Date of Patent: May 12, 1992

[54] DISTRIBUTED CONTROL TELECONFERENCING VOICE BRIDGE

[75] Inventor: David N. Horn, Rumson, N.J.

[73] Assignee: AT&T Bell Laboratories, Murray Hill, N.J.

[21] Appl. No.: 429,579

[22] Filed: Oct. 31, 1989

[51] Int. Cl.⁵ .......................................... H04M 11/00
[52] U.S. Cl. .................................... 379/94; 379/203; 379/205
[58] Field of Search ................... 379/94, 54, 202, 203, 379/204, 205, 206, 158, 306; 340/825.79

[56] References Cited

U.S. PATENT DOCUMENTS 4,082,923  4/1978  Okuhara ............................. 379/306
4,817,082  3/1989  Orsic ............................. 340/825.79

OTHER PUBLICATIONS

E. D. Haszto and N. D. Weber, "ALLIANCE Teleconferencing Services Boost Business Efficiency", AT&T Technology, vol. 3, No. 1 (1988).

Primary Examiner—James L. Dwyer
Assistant Examiner—Stella L. Woo
Attorney, Agent, or Firm—Henry T. Brendzel

[57] ABSTRACT

An arrangement for teleconferencing voice and data is provided through an arrangement that includes a voice bridge that offers individual control of the conferencing setup. The voice bridge comprises a crossbar with crosspoints that include a series connection of two switches and a resistor. One switch of each crosspoint is associated with the row of the crosspoint while the other switch of the crosspoint is associated with the column of the crosspoint. A user, connected to a selected row and column of the crossbar for the "talk" and "listen" functions, respectively, controls the row switches in the crosspoints connected to the user's row and the column switches in the crosspoints connected to the user's column.

13 Claims, 2 Drawing Sheets

DISTRIBUTED CONTROL TELECONFERENCING VOICE BRIDGE

This invention relates to multi-party communications and, more particularly, to conference communications.

In telephonic communications there is often a need to speak with a number of people at the same time. This need is satisfied with existing tele-conference capabilities. These capabilities basically combine the voice signals of interconnected telephones. This combining is accomplished in a "conference bridge" circuit.

There are a number of conference bridges that are available in the art. The AT&T company, for example, offers the ALLIANCE conference bridge, and it is widely used in the AT&T network. It is a sophisticated system that allows conferences to be set up by user and/or attendant setup and control. Conferences are set up through one of four centers (nationwide) to which the conferees are connected. Within the switches of those centers there is a voice bridge where the voice signals of the active talkers (minus the listener's own voice) are summed digitally. The number of such talkers is limited by the system, e.g., to three. Though the ALLIANCE conference bridge is very good, it does have some limitations in applications where individual control of the "talk" and "listen" groupings is desired and where alteration of the conference setup is needed to be dynamic and, essentially, instantaneous. This is typical of the known prior art voice bridges.

It is much more advantageous, however, if users are able to control teleconferencing individually. Such a capability is particularly important in an environment where a number of users in an organization are connected in a LAN arrangement that intends to encompass both data and voice. Since no central control is present in such arrangements, individual and distributed control are almost essential.

SUMMARY OF THE INVENTION

An arrangement for teleconferencing with data and voice is provided through an arrangement that includes a voice bridge that offers individual control of the conferencing setup. The voice bridge architecture is essentially that of a crossbar, with the crosspoints comprising a series connection of two switches and a resistor. One switch of each crosspoint is associated with the row of the crosspoint while the other switch of the crosspoint is associated with the column of the crosspoint. The row is fed by an amplifier and the currents feeding each column are summed and converted to a voltage in a conventional operational amplifier. The row amplifier carried the "talk" signal of a user, and that user controls the row switches of the crosspoints connected to the user's row. In this manner, the user controls who can hear the user's voice. Similarly, each of the column amplifiers forms the "listen" path of a different user. Each user controls the column switches of the crosspoints connected to the user's column. By controlling the column switches each user decides the users to whom the user is listening.

DETAILED DESCRIPTION

With the increased communications capabilities between computing devices, local area networks are being developed for interconnecting not just computers but many different voice, video and data communications devices. Participants can view and manipulate shared multi-media information and can use conference voice capabilities to discusses the data that all view. One such approach is provided in the multi-media conference system depicted in FIG. 1. It is a computer-based "desk-to-desk" multi-media conferencing system that allows one or more groups of users to conference in video, audio and data in a flexible manner. In effect, the user is placed in an "electronic meeting" room where most of the interactions that are carried on in a conventional conference are emulated. In some respects, the system of FIG. 1 is more versatile than a real-life conference system in that users are able to select the conference in which they participate and the degree of participation, merely by providing the proper commands.

Figure 1:
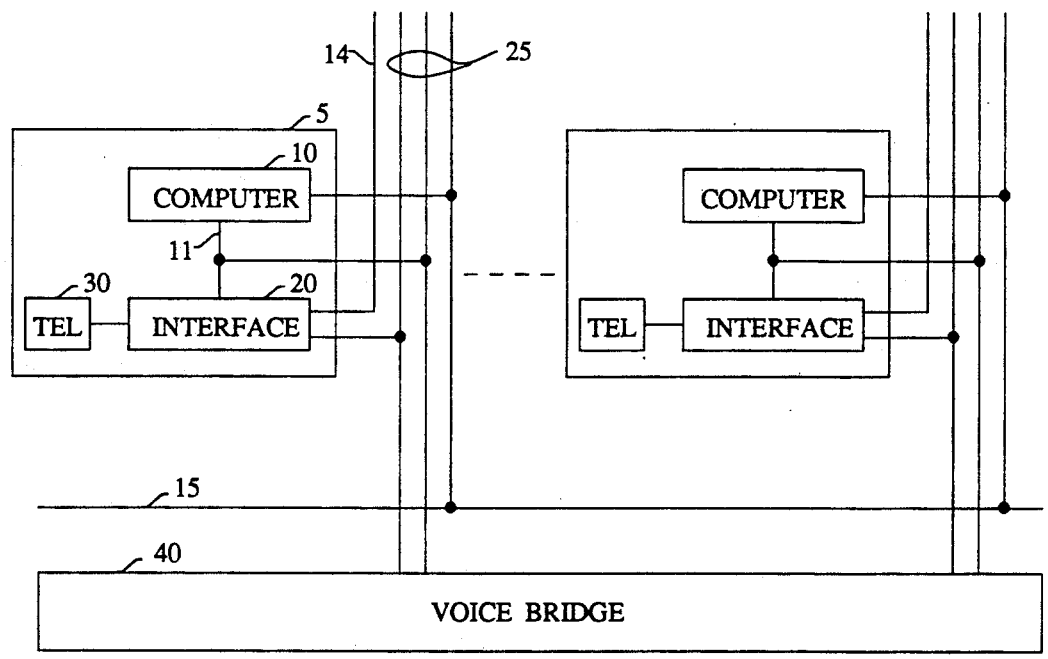
FIG. 1 depicts one application embodying the principles of this invention.

Describing the system of FIG. 1, each user interacts with equipment that is situated in some location, designated by block 5. Generally, block 5 is the user's office, and all of the multi-media communication devices of the FIG. 1 system are in the user's office. Only a telephone is shown in FIG. 1, but it is understood that many interface devices are possible. An arrangement that includes more than just a computer is sometimes called a "workstation". It is contemplated that each user has at least a computer 10, a telephone 30 and a telephone interface circuit 20. Circuit 20 is connected to the user's telephone 30 and to a common conferencing voice bridge 40. It also is connected to a conventional telephone line 14. Computer 10 is connected via line 11 to interface circuit 20 and to voice bridge 40. Computers 10 are also interconnected via Ethernet bus 15. This interconnection creates a voice and data LAN arrangement.

The connection of computers 10 to the telephone interface circuit (e.g., line 11) and to the voice bridge is a control connection. It may be made via the computer's RS232 port and it permits the user to control the interface and the voice bridge through the computer's user interface medium (e.g., mouse, keyboard, etc.). Although interface circuit 20 and voice bridge 40 are both connected to line 11, each only responds to messages addressed to itself. Examples of commands to telephone interface 20 include "pick-up call", "hang-up call", "dial a number", "connect/disconnect telephone or voice bridge", etc. Information flowing the other way may be "ring detected", "phone picked up", "phone hung up", etc.

To summarize, each block 5 interacts with three type of signals that are shared, or communicated, to other blocks 5: voice, control, and data. This matches well with the Basic Rate ISDN, which contains two B (bearer) channels and one D (control) channel. One B channel can be dedicated to the data, which is "bursty" and non-real time. The other B channel is dedicated to digitized voice, which must be in real time, and the control channel is dedicated to the control. Taking advantage of this match with Basic Rate ISDN, FIG. 1 includes an ISDN bus 25 that connects each block 5 to an ISDN central office. The connection of bus 25 offers connectivity to users that are more distant than the users that the LAN can handle. That is, the FIG. 1 arrangement illustrates the possibility of employing the voice bridge in a LAN environment as well as in an ISDN environment. It can even be used in a combined manner, but some means will need to be included to identify whether the LAN or the ISDN environment are to be employed in a particular conference call.

For the sake of brevity and clarity, the following discussion does not address the ISDN connection in detail. It should be understood, however, that the bridging principles of circuit 40, as described in detail below, can advantageously be applied in the central office switches that participate in the dial-up conference connection. That is, each central office or toll switch can have an associated voice bridge 40 that can be used by any party that is on that switch and wishes to originate a conference call.

Figure 2:
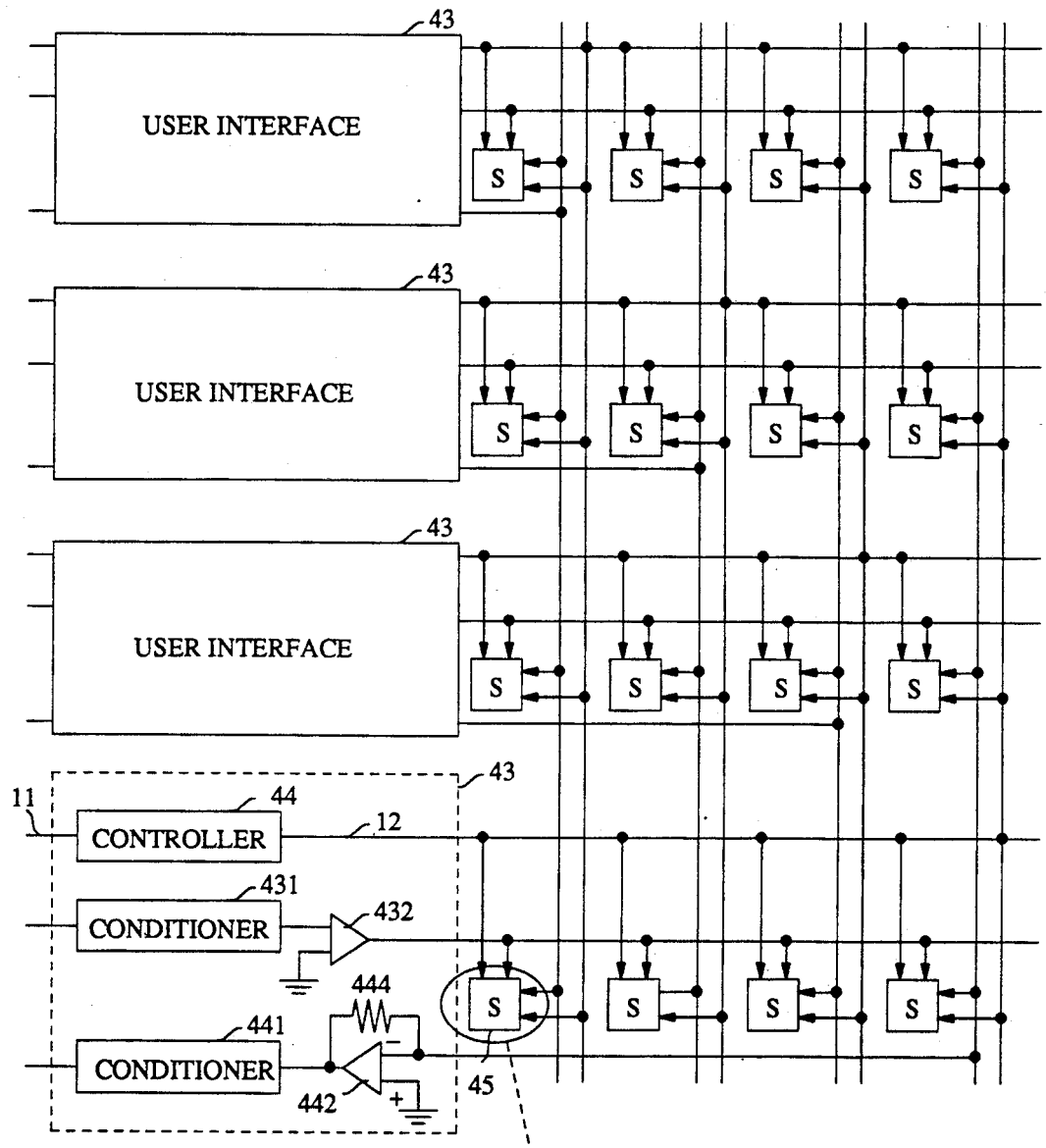
FIG. 2 represents the block diagram of voice bridge 40 in FIG. 1.
Figure 3:
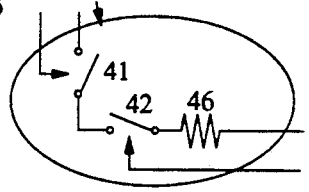
FIG. 3 depicts the components of switch 45 in FIG. 2.

FIG. 2 depicts one schematic diagram of voice bridge 40 in accordance with the principles of this invention. Adapted to handle four users, it comprises a four-column, four-row crossbar arrangement with a switch 45 that connects each row to each column. Actually, switch 45 comprises a pair of switches 41 and 42 and a resistor 46 that are serially connected. Each switch 45 receives a row control signal and a column control signal and, more specifically, switch 41 receives the row control signal and switch 42 receives the column control signal. Each row is connected to a "talk" interface portion of a circuit 43 and each column is connected to a "listen" interface portion of circuit 43. Circuit 43 is connected to circuit 20 of a particular user. The column control signal of a column is the "listen" control signal of a user, and the row control signal of a row is the "talk" control signal of a user. These signals are provided by circuit 20 of the user through control bus 12.

Each circuit 43 in FIG. 2 interfaces with one of the stations 5. It includes a voice channel which may be analog or digital, and the control channel to which RS232 line 11 is connected. Within circuit 43, line 11 is applied to a controller 44 that accepts the RS232 signals of line 11 and converts them to switch closure information on bus 12. The controller may be a simple RS232 detector and a serial to parallel converter (e.g. shift register), or a microprocessor. We employ the latter because the microprocessor easily allows for the use of compact action codes on line 11 (rather than the detailed switch positions of all the switches) that are interpreted in controller 44.

In the "talk" portion of circuit 43, there is a signal conditioner 431 followed by amplifier 432. Conditioner 431 may be a balancing transformer when the input is analog, or a D/A converter, when the input is digital. The output of amplifier 432 is connected to a row of the crossbar switch. In the "listen" portion of circuit 43, amplifier 442 is connected to a column of the crossbar switch and a signal conditioner 441 is connected to the amplifier's output. Signal conditioner 441 may be a balancing transformer or an A/D converter, depending of the type of signal that is to be transmitted. Amplifier 441 is an operational amplifier with a resistor 444 connected between its output and its inverting input. The non-inverting input of amplifier 441 is grounded.

It may be noted that signal conditioner 431 may include various other components such as automatic gain control (AGC), echo canceling circuits, etc. Similarly, signal conditioner 441 may also include other signal conditioning components, such an overall AGC.

In operation, the inverting input of amplifier 441 is at virtual ground potential. Those amplifiers 432 that happen to be connected to a particular column through their respective switches 41 and 42 become current sources through their respective resistors 46. Their currents are summed in the inverting node of amplifier 441 and converted to a voltage level at the amplifier's output. The developed output voltage corresponds to the sum of the output voltages of the amplifiers 432 that feed current to the column.

As explained above, the controller on each port controls the "talk-to" switches on its own row, and the "listen-to" switches on its own column. This control structure allows the users to control their own part of the conference bridge in a fashion that closely resembles natural human interactions. The following scenarios illustrate user's interactions with the voice bridge.

A person who wishes to establish a conference call enters the necessary information to computer 10. The computer sends control signals on the data network of bus 15 to the appropriate parties, informing them that someone wants to reach them (in an ISDN system, this control signal would be sent on the "D" channel of line 11). In normal telephone systems that signal is "ringing". In the system of FIG. 1, that signal is a ringing signal on the called party's telephone 30 supplied by the called party's computer 10 via interface 11 and interface circuit 20, and an indication on the called party's computer screen that uniquely identifies the calling party and the other potential conferees. This "indication" can take many forms. For example, each computer 10 may store a small image of the users in the LAN, in the form of icons, and display the icons of the potential conferees. The originator's icon may be caused to blink at one rate and the icon of the other conferees may be caused to blink at another rate.

In the ISDN environment, where the voice bridge is associated with a telephone company switch, the icons are not available. Hence, in such an environment each user that participates in the conference multicasts its own icon to the others, either from the local central office to which each user is connected or from the user's own computer 10. Concurrently with the signaling over the data bus, the calling party's computer sends control signals to interface card 20 directing it to activate the appropriate "talk to" and "listen to" switches.

Having been alerted to the incoming call, each of the called parties chooses to either respond or ignore the call. To respond, the called party directs its computer to accept the conference call and set the appropriate "talk to" and "listen to" switches on its voice bridge port. While doing so, the responding party's computer also communicates the nature of its action to the other computers via the data bus. In this manner each of the parties participating in the conference is aware of the other participants. The data bus of the FIG. 1 system is then used to maintain knowledge of the conference status. In this manner, each user knows who is fully connected, who is just listening, who cannot hear the user, whom the user cannot hear and who has dropped out. It may be noted as an aside that a conferee who hasn't picked up or who has dropped out does not impede the normal progress of the conference. No action need to be taken by the other parties. Furthermore, the dropped conferee can re-enter the conference also without further action by the other parties.

To add a new member to an existing conference does require some action from all existing participants to update their cross-bar switch settings, but only one of the participants need to "place a call" to the new member. Of course, the updating of the crossbar switches is controlled by the software of computer 10. That is, in some applications the software may be arranged so that each conferee must actively accept another participant by directing the user's computer 10 to make the necessary switch connections. In other applications, on the other hand, this may be done automatically by the software, so that when one conferee adds a new member to the conference, the computer (10) of all the conferees automatically make the necessary adjustments in the switch settings.

One attribute of the cross-bar architecture of voice bridge 40 is that it supports multiple simultaneous conferences. Indeed, it permits one party to participate in more than one conference. The party can alternate between the conferences or concurrently participate in a number of conferences (without the other participants in the each of the conferences being aware of the other conferences).

One attribute of the specific FIG. 2 crossbar architecture, by virtue of the serial connection of switches 41 and 42, is its ability to mute or to carry on a "side conference" within a larger conference. The latter is analogous to whispering with someone within a normal meeting, and less distracting to the others. Muting is accomplished by the user permitting no one to hear the user, while a side conference is created by the user permitting only some of the conferees to hear the user.

As described above, voice bridge 40 has a fully distributed conferencing control arrangement. The overall control (for the purpose of setting up and managing the conference calls) is distributed in that each computer 10 controls its own participation and by allowing the the digital network to be used by each computer 10 for the purpose of signaling parties and multicasting its state to all.

It may be noted that since the voice bridging is accomplished in the analog domain, the conferencing of users who employ different coding techniques for their voice signals is quite simple. Each port within bridge 40 may have a different D/A and A/D coder pair to correspond to the user's preference or a number of selectable codecs, such as mu-law and A-law PCM, the CCITT G722 codec, and others.

I claim:

1. An apparatus comprising:
   M row signal lines and M column signal lines;
   a plurality of crosspoint circuits, each connected to one of said row signal lines and to one of said column signal lines;
   a row control bus associated with each of said row signal lines for controlling signal flow into those of said crosspoint circuits that are connected to each of said row signal lines;
   a column control bus associated with each of said column signal lines for controlling signal flow from those of said crosspoints that are connected to each of said column signal lines; and
   M user interface circuits, each user interface circuit associated with a user apparatus supporting bidirectional communication each connected to one of said row signal lines and its associated row control bus, and to one of said column signal lines and its associated column control bus, for applying signals to its row, for controlling the signal flow through the crosspoints connected to its row and to its column and for receiving signals from its column wherein each of said crosspoint circuits comprises a series connection of two switches connected between a row signal line and a column signal line.

2. The apparatus of claim 1 wherein the series connection of two switches is interposed between the row signal line connected to said crosspoint circuit and the column signal line connected to said crosspoint circuit and further comprising a first control port connected to said row control bus for controlling the state of one of said switches in said series connection and a second control port connected to said column control bus for controlling the state of the other of said switches in said series connection.

3. The apparatus of claim 2 wherein said series connection of switches includes a resistor.

4. An apparatus comprising:
   row signal lines and column signal lines;
   a plurality of crosspoint circuits, each connected to one of said row signal lines and to one of said column signal lines;
   a row control bus associated with each of said row signal lines for controlling signal flow into those of said crosspoint circuits that are connected to each of said row signal lines;
   a column control bus associated with each of said column signal lines for controlling signal flow from those of said crosspoints that are connected to each of said column signal lines; and
   a plurality of user interface circuits, each connected to one of said row signal lines and its associated row control bus, and to one of said column signal lines and its associated column control bus, for applying signals to its row, for controlling the signal flow through the crosspoint circuits connected to its row and to its column and for receiving signals from its column, wherein
   each of said user interface circuits is connected to a different user port of said apparatus,
   each of said user ports includes an input signal line, an output signal line and a control line, and
   each of said interface circuits comprises a talk section interposed between its input signal line and its row, a listen section interposed between its output signal line and its column, and a control section interposed between its control line and its row control and column control buses; and wherein
   said talk section includes a first amplifier for applying a voltage onto its row that corresponds to a voltage received at its input line;
   said listen section includes a second amplifier, responsive to sum of currents at its column, for delivering an output signal to said output line that corresponds to sum of currents; and
   said control section comprises signal manipulation means for developing, from control messages received from said control line, switch control signals for said row control bus and said column control bus and means for storing said switch control signals.

5. The apparatus of claim 4 wherein said talk section includes signal conditioning means interposed between said first amplifier and said input line.

6. The apparatus of claim 5 wherein said signal conditioning means comprises a D/A converter.

7. The apparatus of claim 5 wherein said signal conditioning means comprises a balancing transformer.

8. The apparatus of claim 4 wherein said listen section includes signal conditioning means interposed between said second amplifier and said output line.

9. An apparatus comprising:

M row signal lines and M column signal lines;

a plurality of crosspoint circuits, each connected to one of said row signal lines and to one of said column signal lines;

a row control bus associated with each of said row signal lines for controlling signal flow into those of said crosspoint circuits that are connected to each of said row signal lines;

a column control bus associated with each of said column signal lines for controlling signal flow from those of said crosspoints that are connected to each of said column signal lines; and M user interface circuits, each user interface circuit associated with a user apparatus supporting bidirectional communication each connected to one of said row signal lines and its associated row control bus, and to one of said column signal lines and its associated column control bus, for applying signals to its row, for controlling the signal flow through the crosspoints connected to its row and to its column and for receiving signals from its column.

wherein each of said interface circuits is connected to a different user port of said apparatus and further comprising a plurality of computers, each connected to a different one of said ports, and still further comprising an additional digital network for interconnecting said computers.

10. An apparatus comprising:

M row signal lines and M column signal lines;

a plurality of crosspoint circuits, each connected to one of said row signal lines and to one of said column signal lines;

a row control bus associated with each of said row signal lines for controlling signal flow into those of said crosspoint circuits that are connected to each of said row signal lines:

a column control bus associated with each of said column signal lines for controlling signal flow from those of said crosspoints that are connected to each of said column signal lines; and M user interface circuits, each user interface circuit associated with a user apparatus supporting bidirectional communication each connected to one of said row signal lines and its associated row control bus, and to one of said column signal lines and its associated column control bus, for applying signals to its row, for controlling the signal flow through the crosspoints connected to its row and to its column and for receiving signals from its column wherein each of said interface circuits is connected to a different user port of said apparatus, and further comprising a plurality of workstations, each connected to a different one of said user ports; and an additional digital network for interconnecting said work stations.

11. The apparatus of claim 10 wherein each of said work stations includes a computer having a first port connected to said digital network and a second port, a telephone, and a voice interface circuit connected to said second port and to said telephone.

12. The apparatus of claim 11 wherein said second port is connected to said control line of said user port and said voice interface circuit is connected to said input line and to said output line of said user port.

13. The apparatus of claim 12 wherein said second port is an RS232 serial port.

* * * * *